(12) United States Patent
Raghunathan et al.

(10) Patent No.: US 8,831,801 B1
(45) Date of Patent: Sep. 9, 2014

(54) SYSTEM AND METHOD FOR OPTIMIZING ENERGY CONSUMPTION IN RAILWAY SYSTEMS

(71) Applicants: Mitsubishi Electric Research Laboratories, Inc., Cambridge, MA (US); Mitsubishi Electric Corporation, Tokyo (JP)

(72) Inventors: Arvind U Raghunathan, Brookline, MA (US); Toshihiro Wada, Tokyo (JP); Kenji Ueda, Tokyo (JP); Satoru Takahashi, Tokyo (JP)

(73) Assignees: Mitsubishi Electric Research Laboratories, Inc., Cambridge, MA (US); Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/803,857

(22) Filed: Mar. 14, 2013

(51) Int. Cl.
| | |
|---|---|
| B60L 9/04 | (2006.01) |
| G06F 17/11 | (2006.01) |
| G06Q 50/00 | (2012.01) |
| B61L 99/00 | (2006.01) |
| G06Q 50/06 | (2012.01) |
| B60L 11/18 | (2006.01) |

(52) U.S. Cl.
CPC .............. *B61L 99/00* (2013.01); *B60L 2200/26* (2013.01); *G06F 17/11* (2013.01); *G06Q 50/06* (2013.01); *B60L 9/04* (2013.01); *B60L 11/1842* (2013.01)
USPC ............................................ 701/19; 700/291

(58) Field of Classification Search
CPC . G06F 17/11; B61L 27/0027; B61L 2027/00; G06Q 50/06; G06Q 50/30; B60L 9/04; B60L 11/1842; B60L 2200/26
See application file for complete search history.

(56) References Cited

U.S. PATENT DOCUMENTS

| | | | | |
|---|---|---|---|---|
| 5,467,945 | A * | 11/1995 | Kubota et al. ................... | 246/26 |
| 8,146,513 | B2 * | 4/2012 | Ibaiondo Madariaga et al. ............................ | 104/289 |
| 8,674,541 | B2 * | 3/2014 | Peitzke et al. ................. | 307/9.1 |
| 2011/0316333 | A1 | 12/2011 | Still | |
| 2013/0147441 | A1 * | 6/2013 | Lee et al. ....................... | 320/167 |
| 2013/0166232 | A1 * | 6/2013 | Lee et al. ........................ | 702/62 |
| 2014/0012454 | A1 * | 1/2014 | Fournier et al. ................. | 701/23 |

FOREIGN PATENT DOCUMENTS

| | | |
|---|---|---|
| JP | 07-304353 | 11/1995 |
| JP | 200824206 | 7/2008 |

OTHER PUBLICATIONS

Kim et al.; "A Mathematical Approach for Reducing the Maximum Traction Energy: The Case of Korean MRT Trains"; IMECS, Mar. 17-19, 2010.*

(Continued)

*Primary Examiner* — Michael J Zanelli
(74) *Attorney, Agent, or Firm* — Dirk Brinkman; Gene Vinokur

(57) ABSTRACT

A method optimizes energy consumption in a railway system including a set of trains and a set of substations connected to a grid. The method optimizes control parameters controlling at least part of the energy consumption of the railway system to produce optimized control parameters minimizing a total power provided by the grid to satisfy a power demand of the railway system. The optimizing is subject to constraints on operations of the railway system, which include as complementarily constraint. Next, the method generates a command to control the energy consumption of the railway system based on the optimized control parameters.

17 Claims, 11 Drawing Sheets

(56) References Cited

OTHER PUBLICATIONS

Nasri et al.; "Timetable Optimization for Maximum Usage of Regenerative Energy of Braking in Electrical Railway Systems"; SPEEDAM 2010; Intl. Sym. on Power Electronics, Electrical Drives, Automation and Motion; pp. 1218-1221; IEEE, 2010.*

Gonzalez et al.; "Power Losses Minimization in D.C. Electric Railways by means of Traction Substations Coordinated Voltage Control"; Conf. on Railway Traction Systems (RTS 2010); Apr. 13-15, 2010; pp. 1-5.*

Leyffer, Sven., "Mathematical Programs with Complementarity Constraints." Feb. 28, 2003.

* cited by examiner

100

200

300

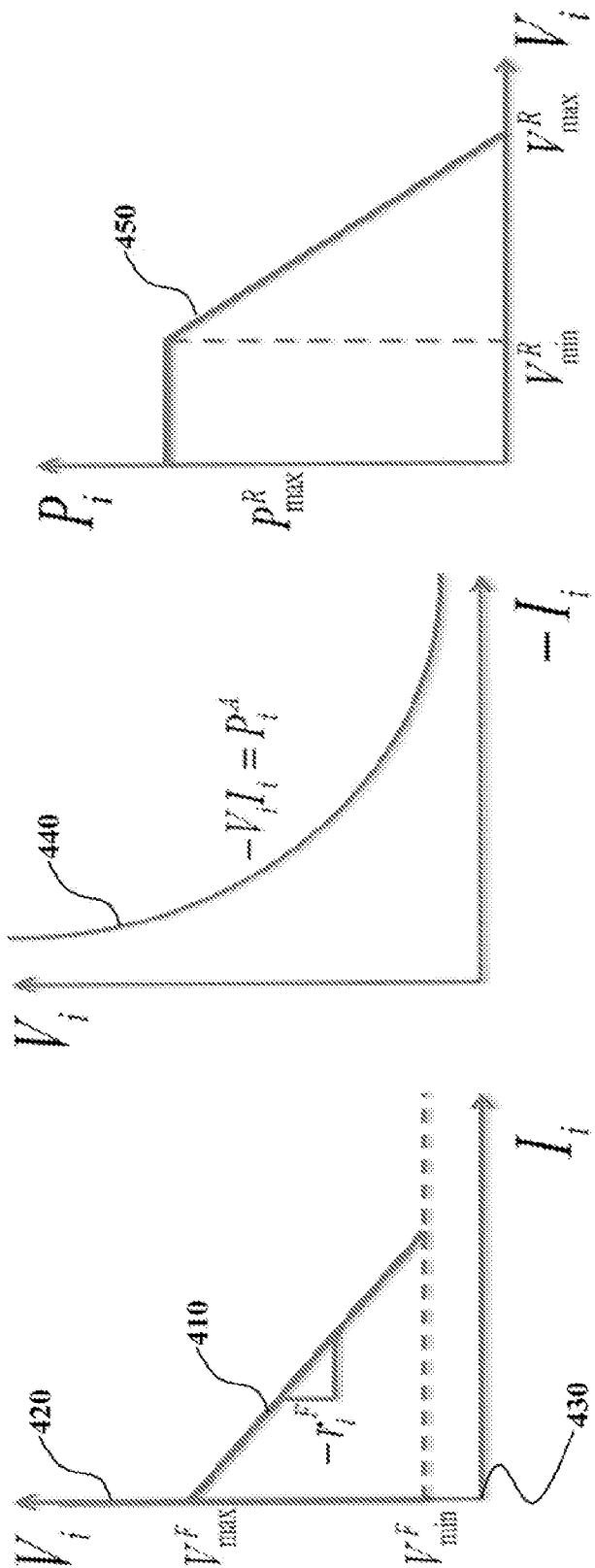

Fig. 5 optimization

$$\min \sum_{i \in S^F} V_i I_i$$

s.t.
$$V_i \geq V^{F,\min}$$
$$V_i = V^{F,\max} - r^F I_i + \alpha_i \quad \Big\} \, i \in N^F$$
$$I_i \geq 0, \alpha_i \geq 0, I_i \alpha_i = 0$$

$$V_i I_i = -P_i^A \quad \Big\} \, i \in N^A$$
$$V_i \geq 0, I_i \leq 0$$

$$V_i \geq V^{R,\min}$$
$$V_i \leq V^{R,\max} - \dfrac{V^{R,\max} - V^{R,\min}}{P^{R,\max}} I_i \quad \Big\} \, i \in N^R$$
$$I_i \geq 0$$

$$V_i - V_j = R_{ij} I_{ij}$$
$$\sum_{(j,i) \in E} I_{ji} + I_i = \sum_{(i,j) \in E} I_{ij} \quad \Big\} \, i \in N$$

— 510 measurements at nodes

$N$ - set of nodes
$E$ - set of edges
$N^F$ - set of nodes that are feeding stations
$N^A$ - set of nodes that are consuming trains
$N^R$ - set of nodes that are regenerating trains $V^{F,\min}, V^{F,\max}$ - min and max voltages at feeding stations
$r^F$ - internal resistance at feeding stations
$P_i^A$ - power required by consuming train
$V^{R,\min}, V^{R,\max}$ - min and max voltages at regenerating trains
$P^{R,\max}$ - max power from regenerating trains
$R_{ij}$ - line resistance $V_i$ - node voltages
$I_i$ - current injected at nodes
$I_{ij}$ - line currents
$\alpha_i$ - measure of feeding station max voltage violation

— 520

1 Let $z^0 := (V^0, I^0, I^{L,0}, a^0, \delta^0, s^0, (s^c)^0)$ be an initial iterate with $\delta^0, (s^c)^0 > 0, I^0_{i,j}, a^0_{i,j} > 0 \forall i \in \mathcal{N}^A$ 2 Choose $\hat{\delta} > 0, \mu^0 > 0, \tau \in (0,1], \beta \in (0,1)$ and tolerance $\epsilon > 0$ 3 Set $l = 0$ 4 while $\mu^l > \epsilon$ do 5     Solve barrier problem in (9) using $z^l$ to obtain solution $z^{l+1}$ 6     Set $\mu^{l+1} = \min(\beta \mu^l, (\mu^l)^{1+\tau})$ 7     Set $l = l + 1$ 8 end 9 return $z^l$ as solution

Inequality Reformulation

*Fig. 8*

1 Let $z^0 := (v^0, l^0, (l^L)^0, \alpha^0, s^0, (s^L)^0)$ be an initial iterate with $s^0, (s^L)^0 > 0, l^0, \alpha^0 > 0 \forall i \in$
2 Choose $\delta > 0, \mu^0 > 0, \tau \in (0,1], \beta \in (0,1)$ and tolerance $\epsilon > 0$
3 Set $l = 0, \eta_i = \delta\mu^0 \forall i \in \mathcal{N}^A$
4 while $\mu^l > \epsilon$ do
5     Solve barrier problem in (0) using $z^l$ to obtain solution $z^{l+1}$
6     Set $\mu^{l+1} = \min(\beta\mu^l, (\mu^l)^{1+\tau})$
7     for $i \in \mathcal{N}^A$ do
8        if $l_i^{l+1} \alpha_i^{l+1} > \delta\mu^l$ then
9           Set $\eta_i = \delta\mu^{l+1}$
10        end
11     end
12     Set $l = l + 1$
13 end
14 return $z^l$ as solution

ADAPTIVE RELAXATION
1100

*Fig. 11*

SYSTEM AND METHOD FOR OPTIMIZING ENERGY CONSUMPTION IN RAILWAY SYSTEMS

FIELD OF THE INVENTION

This invention relates generally to railway systems, and more particularly to optimizing energy consumption in railway systems.

BACKGROUND OF THE INVENTION

It is desired to reduce energy consumption in railway systems. Several methods are known that reduce energy during an operation of the railway systems. However, the conventional methods generally use static models, or only consider energy efficiency of the individual trains. For example, various run curve optimization methods can reduce energy consumption of the train. Regenerative braking can provide additional energy for the train. Although the conventional methods can increase energy efficiency, those methods do not consider global optimization of the operation of the railway system, and do not minimize total energy consumption.

For example, U.S. 20050000386 describes a railway car drive system for accelerating and deaccelerating a train by operating a driving motor, and to improve the power efficiency of the drive system, and recovering the generative power to reduce the load borne by the braking system, and to improve the safely and reliability of the railway car drive system.

U.S. 20060005738 describes power generation capability through a traction motor linked to a driving wheel of a train. A controller selectively operates the traction motor in a motoring mode, a coasting mode, or a dynamic braking mode. In the dynamic braking mode, electrical energy is transmitted to an electrical energy storage system. The controller receives control commands from an external control source indicating the operating mode for a particular period of time.

Similarly, U.S. Pat. No. 7,940,016 relates to generative braking methods for a locomotive. Four methods for recovering energy from generative braking and for transferring the energy to energy storage system are disclosed.

Accordingly, it is desired to provide a system and a method for optimizing energy consumption so that the total power provided by the grid to the railway system is minimized, while the energy demand of the railway system is satisfied.

SUMMARY OF THE INVENTION

The embodiments of the invention are based on a realization that additionally or alternatively to improving the energy efficiency of the trains individually, the total energy consumption of the railway system can also be optimized. For example, power, generated by regenerative braking, decreases with an increase of the voltage at the braking train. This goes counter to the approach of operating the trains at high voltages. Therefore, the control parameters for the voltages at the power regenerating trains can be optimized to reduce the total energy consumption. Also, if the railway system does not consume all the regenerative power, potentially damaging power surges can occur. Thus, the global optimization can also improve safety in the railway system.

However, the optimization of control parameters controlling at least part of the energy consumption of the railway system has to be performed subject to constraints on various components of the railway system. The constraints of the railway system can include discontinuities, which makes the optimization problem ill-posed. Accordingly, some embodiments of the invention are based on a general realization that for optimization of the control parameters of the railway system, the discontinuities of the constraints have to be reformulated as complementarity constraints. Such reformulation allows using various non-linear optimization solvers provided the complementarity constraints are appropriately handled.

Accordingly, various embodiments optimize the control parameters of the railway system subject to the complementarity constraints. Some embodiments use non-linear optimization methods to determine the control parameters. However, due to the limitation on a feasibility region defined by the complementarity constraints, some non-linear optimization methods solve complementarity constraint problem with unacceptably high error rate. Therefore, some embodiments of the invention optimize the control parameters based on iterative relaxation of the complementarity constraint. The iterative relaxation of the complementarity constraint can approximate ill-posed problem as a set of well-posed problems, which increase an accuracy of the solution and reduce computational time.

For example, one embodiment optimizes the control parameters using an interior point method. This embodiment is based on a realization that relaxation of the complementary constraints results in inequality constraints, which is a difficult optimization problem. However, the interior point method can efficiently address the inequality constraints and thus can benefit the iterative relaxation method.

Alternative embodiments are based on a realization that with a reduction of the relaxation parameter, the well-posed problems are progressively transformed into ill-posed problems. Therefore, it is advantageous to reduce the relaxation parameter only when necessary. Thus, one embodiment of the invention optimizes the control parameters iteratively using adaptive modification of a relaxation parameter. In this embodiment, for each iteration, the relaxation parameter is modified only if the complementarity constraint for a current value of the relaxation, parameter is violated.

In one embodiment, the complementarity constraint for a substation of the railway system includes a product of a current and an excessive voltage at the substation. The optimization according to this embodiment reformulates the complementarity constraint as an inequality, such that the product of the current and the excessive voltage is less than a relaxation parameter. Next, this embodiment determines the control parameters iteratively based on the inequality, wherein a value of the relaxation parameter is adaptively reduced for subsequent iterations. In one variation of this embodiment, the current iteration includes determining the control parameters based on values of the control parameters determined during a previous iteration. The inequality is tested using values of the control parameters corresponding to that of the current and the excessive voltage of the substation, and the value of the relaxation parameter is modified if the inequality is violated.

Some embodiments combine adaptive relaxation with an interior point method to further optimize the solution. For example, one embodiment determines the relaxation parameter to be proportional to the harrier parameter. This proportionality simplifies determining of the modified value of relaxation parameter in subsequent iterations. This is because the barrier parameters are monotonically decreasing, and when the relaxed complementarity constraint, is violated, the relaxation parameter is modified to match appropriately the reduction in barrier parameter.

Accordingly, one embodiment discloses a method for optimizing an energy consumption of a railway system including a set of trains and a set of substations connected to a grid for providing power to the set of trains. The method includes optimizing control parameters controlling at least part of the energy consumption of the railway system to produce optimized control parameters minimizing a total power provided by the grid to satisfy as power demand of the railway system, wherein the optimizing is subject to constraints on operations of the railway system, the constraints include a complementarity constraint; and generating a command to control the energy consumption of the railway system based on the optimized control parameters. Steps of the method are performed by a processor.

Another embodiment discloses a system for optimizing an energy consumption of a railway system including a set of trains and a set of substations connected to a grid for providing power to the railway system. The system includes a processor for optimizing control parameters controlling at least part of the energy consumption of the railway system, such that a power demand of the railway system is satisfied and a total power provided by the grid is minimized, wherein the optimizing is subject to constraints on operations of the trains and constraints on operations of the substations, wherein the constraints on the operations of the substations include a complementarily constraint, wherein the processor optimizes the control parameters based on a relaxation of the complementarity constraint.

Following is a summary of variables, terms and notations used in the detailed description below.

| | |
|---|---|
| $N$ | set of nodes in the network |
| $N^F$ | subset of nodes in the network corresponding to substations |
| $N^A$ | subset of nodes in the network corresponding to power consuming trains |
| $N^R$ | subset of nodes in the network corresponding to regenerative trains |
| $r_i^L$ | resistance on the electrical line joining node i and i + 1 |
| $r_i^F$ | internal resistance associated with substation i |
| $V_{min}^F$ | minimal voltage at substation |
| $V_{max}^F$ | maximal voltage at substation |
| $V_{min}^R$ | minimal voltage at regenerative trains |
| $V_{max}^R$ | maximal voltage at regenerative trains |
| $P_{max}^R$ | maximal power that can be produced by regenerative trains |
| $V_i$ | voltage at node i |
| $I_i$ | current supplied to network from node i |
| $I_i^L$ | current flowing between nodes i and i + 1 |
| $P_i^A$ | specified power consumed by accelerating or coasting trains |
| $P_i^R$ | power produced by the regenerative trains |
| $V$ | set of voltages at the nodes |
| $I$ | set of currents supplied to the network from the nodes |
| $I^L$ | set of currents in the DC network |
| $P^R$ | set of power supplied to the DC net network by regenerative trains. |

BRIEF DESCRIPTION OF THE DRAWING

FIG. 4A is a plot, of feasible values of voltages for given currents at substations of the railway system according to one embodiment of the invention;

FIG. 4B is a plot of relationship of voltage and current for power consuming trains in the railway system according to one embodiment of the invention;

FIG. 4C is a plot of relationship of voltage and current for regenerative trains in the railway system according to one embodiment of the invention;

FIG. 5 is an example of the optimization subject to complementarity constraints using the relationships of various measurements of voltages, currents, resistances at nodes in the railway system according to one embodiment of the invention.

FIG. 8 is a pseudocode of the method for complementarity inequality reformulation according to one embodiment of the invention.

FIG. 11 shows a pseudocode for solving the barrier problem with adaptive relaxation according to one embodiment of the invention.

DETAILED DESCRIPTION OF THE PREFERRED EMBODIMENTS

Railway System

The embodiments of the invention optimize an energy consumption of a railway system that includes a set of trains and a set of substations. The substations are connected to a grid and provide power to the set of trains. Optimizing energy consumption includes minimizing the amount of power supplied to the railway system from the grid. The embodiments can reflect, in real-time, dynamically varying, states of the railway system, in terms of locations and identifications of substation and trains, and measured electrical characteristics such voltages, currents, and resistances in power lines of DC network connecting the substations and trains.

Figure 1A:
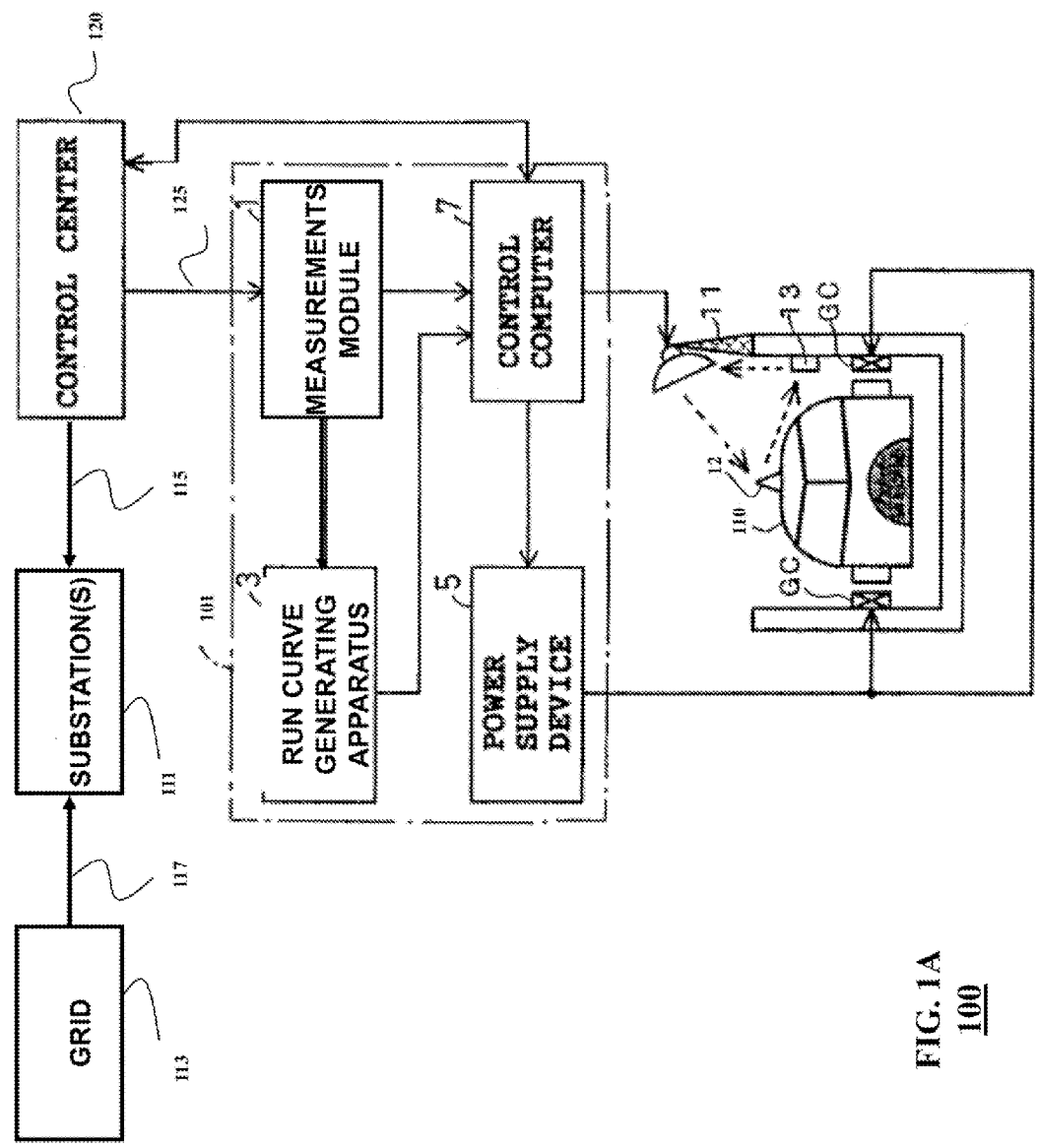
FIG. 1 is a schematic of a railway system according to some embodiments of the invention.

FIG. 1 show a railway system 100 according to some embodiments of the invention. The railway system 100 includes a set of trains, such as a train 110 and a set of substations 111. The train 110 can be an electrical train, wherein the electric power is converted and supplied to feeders or ground coils (GC) via breakers. The train can use regenerative braking to generate energy. The energy can be stored in the power supply device 5, or distributed to other trains in the railway system.

A control system 101 of the train 110 can include one or combination of a measurement module 1, a run curve generation apparatus 3, a power supply device 5, and a control computer 7. The control system determines the state of the train. The state can include locations and the power demands of the trains. The state can also include positions and velocities of the trains and next actions of the trains. The state can be determined by one or combination of the control computer 7 and the measurement module 1. For example, the state can be defined by run curve of the train determined by the run curve generating apparatus 3. The run curve can be updated based on the measurements determined by the measurement module 1. For example, the measurements module can includes a GPS unit for determining the location of the train. The measurement module can also include an energy meter for measuring a power demand or a power excess of the train.

The implementation of the control system can be performed within the circuits of the train, in a remote control center 120, and/or can be distributed between the vehicle and the control center 120. The communications between the vehicle and the control center can be achieved using wireless transceivers 11-13. Various components and modules of the control system and control center can be implemented using a processor.

In various embodiments, the control center 120 is also connected to the substations 111 and to the grid 113. The control center optimizes control parameters controlling at least part of the energy consumption of the railway system to produce optimized control parameters minimizing a total power 117 provided by the grid 113 to satisfy a power demand of the railway system. The control center generates a command 115 and/or 125 to control the energy consumption of the railway system based on the optimized control parameters. For example, the control parameters can include values of voltages and currents at each substation and each train.

Figure 2:
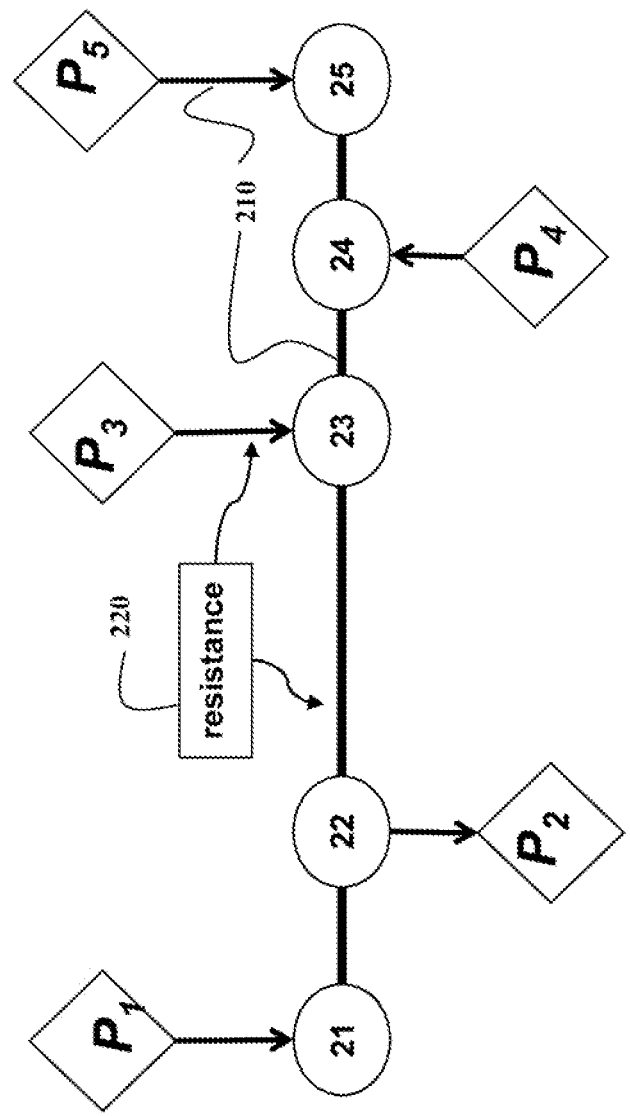
FIG. 2 is graphical representation the railway system.

FIG. 2 shows an example of the railway system 100 represented as a graph 200. The graph includes nodes 21, 23 and 25 representing a set of substations receiving power $P_1, P_3$ and $P_5$ from an electric grid, a node 22 representing a set of power consuming trains $P_2$, and a node 24 representing a set of power generating trains $P_4$. The edges joining the nodes represent power lines 210 in the DC network connecting the substations and the trains. Resistance 220 of the power lines is typically known. Additional substations 111 and trains can be incorporated into the graph 200 to represent practical railway systems 100.

Optimization Method

The embodiments of the invention are based on a realization that additionally or alternatively to improving the energy efficiency of the trains individually, the total energy consumption of the railway system can also be optimized. For example, power, generated by the regenerative braking, decreases with an increase of the voltage at the braking train. This goes counter to the approach of operating the trains at high voltages. Therefore, the control parameters for the voltages at the power regenerating trains can be optimized to reduce the total energy consumption. Also, if the railway system does not consume regenerative power, potentially damaging power surges can occur. Thus, the global optimization can also improve safety in the railway systems.

However, the optimization of control parameters controlling at least part of the energy consumption of the railway system has to be performed subject to constraints on various components of the railway system. The constraints of the railway system can include discontinuities, which makes the optimization problem ill-posed. Accordingly, sonic embodiments of the invention are based on a general, realization that for optimization of the control parameters of the railway system, the discontinuities of the constraints have to be reformulated as complementarity constraints. Such reformulation enables using various non-linear optimization solvers.

Figure 3:
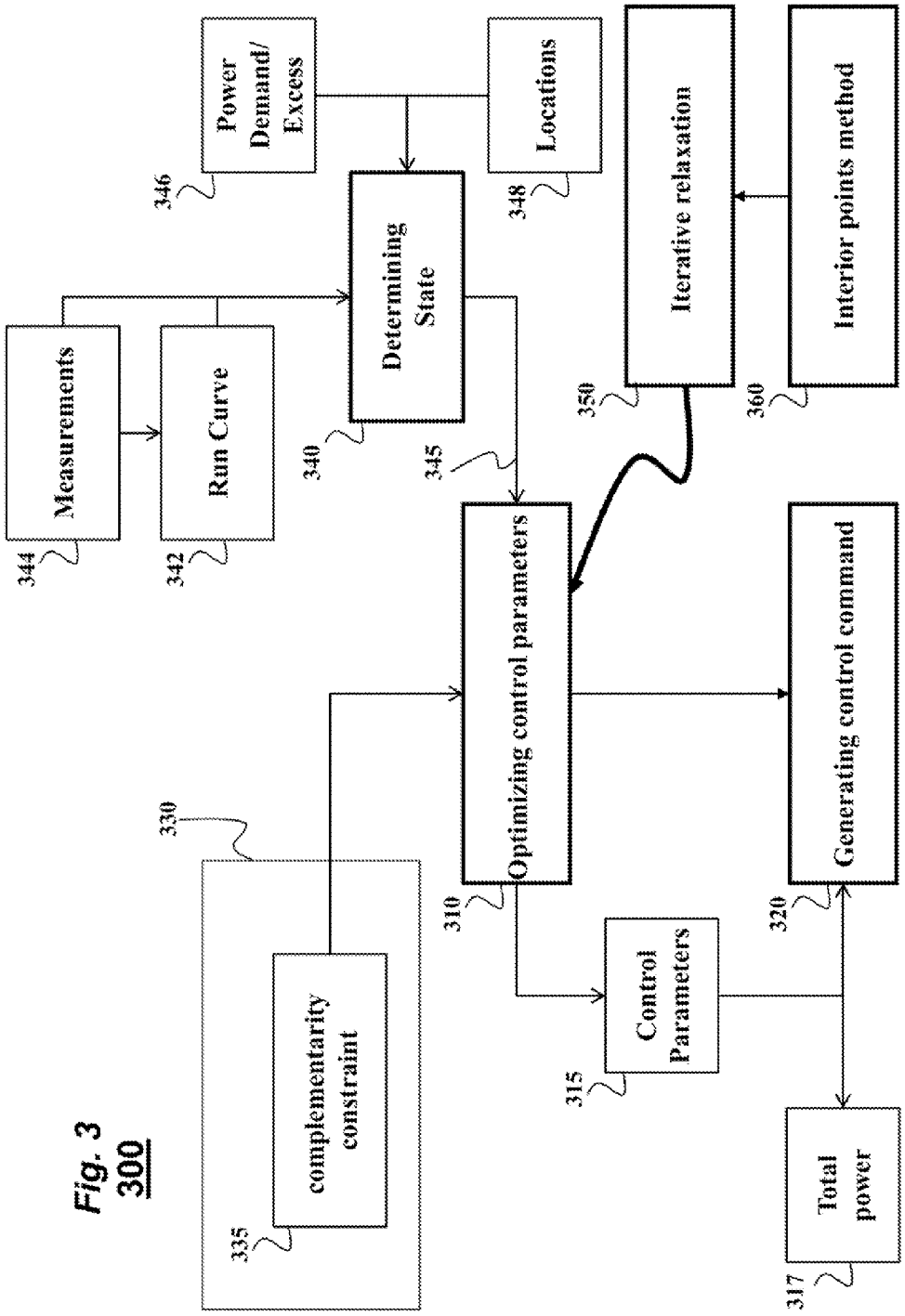
FIG. 3 is a block diagram of a method for optimizing an energy consumption of the railway system, such as systems shown in FIGS. 1 and 2, according to one embodiment of the invention.

FIG. 3 shows a block diagram of a method for optimizing an energy consumption of a railway system including a set of trains and a set of substations 111 connected to a grid for providing power to the set of trains. The set of trains can include a set of power consuming trains and a set of power regenerating trains.

The inputs to the method can include one or combination of a description of the substations, power consuming trains and power generating trains. The description can include one or combination of an identification, location and power consumption and power generation related information, in general the state of the railway. The output of the method can include optimal power related quantities at the substations and trains, particular the amount of power regenerated by deaccelerating trains and fed back to the substations.

The method optimizes 310 control parameters 315 controlling at least part of the energy consumption of the railway system to produce optimized control parameters 315 minimizing a total power 317 provided by the grid to satisfy a power demand of the railway system. For example, the control parameters can include values of voltages and currents for each substation and for each train. Next, a command to control the energy consumption of the railway system based on the optimized control parameters is generated 320. The steps of the method can be performed by a processor 300.

The optimization 310 is subject to constraints 330 on operations of the railway system. The constraints include, e.g., constrains on operation of the trains and constraints on operation of the substation. In various embodiments, the constraints include a complementarity constraint 335. The complementarily constraints 335 allow solving the optimization problem subject to discontinuity constraints typically imposed on the railway systems.

For example, in one embodiment, the complementarity constraint includes a product of a current at a substation and an excessive voltage at the substation. This formulation allows transforming discontinuities of the constraint of the substation into the complementarity constraints, which, respectfully, reformulates optimization subject to discontinuity constraints into optimization subject to complementarity constraints 335.

In some embodiments, the method optimizes the control parameters based on a state 345 of railway system. The state can be determined 340 at a particular time, and can include location 348 of the trains, the power demand 346 of the power consuming trains, and/or power excess of the power regenerating trains. For example, a total power demand of the railway system can be determined based on states of each train of the railway system, e.g., by subtracting the power excess of the train from the power demand of the trains and considering energy loses based on resistance of the power lines. In one embodiment, the method determines the state based on run curves 342 of the trains. The usage of the run curves allows avoiding or minimizing real time measurements in the railway system, which can be expensive. Additionally, one embodiment modifies the determined state based on measurements 344 of the state at the point of time, which can improve the accuracy of the determination of the state while minimizing the amount of measurements.

The method can be performed repeatedly to dynamically determine a state of operation of the railway system, and optimize power usage accordingly. For example, the optimization is performed every five seconds or less. In addition, the processing can be performed in a distributed manner, e.g., at the substations and/or at trains.

The method can take as input, various measurements of electrical conditions, and dynamically changing configuration of the railway system as the trains move. The conditions are constrained as described below. The input can be transformed to determine a state of the railway system based on the sensed data using, for example a supervisory control and data acquisition (SCADA) system.

Substations

FIG. 4A shows feasible values 410 of voltages as a function of currents at substations. As defined, herein, feasible means capable of being according to, e.g., a feasible plan.

If no current is consumed, then the entire voltage axis above $V_{min}^F$ is feasible. The substations receive power from an external electric grid and power the trains. A voltage and current model for substation i is $$V_i \in \begin{cases} [V_{min}^F, V_{max}^F - r_i^F I_i] \text{if } I_i > 0 \\ [V_{min}^F, \infty) \text{if } I_i = 0 \end{cases} \forall i \in N^F, \quad (1)$$

$$I_i \geq 0$$

where $V_i$ is the voltage, $I_i$ is the current consumed, $V_{min}^F$, $V_{max}^F$ are minimal, maximal operational voltages, and $r_i^F$ is the internal resistance 220 at the substations.

in one embodiment, a non-negativity requirement on the current $I_i$ ensures that the substation does not feed power back to the electric grid if the DC network does not include an inverter. This restriction reflects the problem instances that are considered, and is not a limitation for other embodiments. However, if the DC network cannot consume all the regenerative power, potentially damaging power surges can occur.

The voltage at the substation has a discontinuity 420 at current 430 $I_i$=0. In other words, there is an upper limit on the voltage $V_i$ when power is consumed from the substation. There are no upper limits when power is not consumed from the substation. Discontinuities are not desirable for well-posed nonlinear programs (NLP), which assume differentiability of functions and constraints.

Therefore, various embodiments reformulate the model Eqn. (1) using complementarity constraints, $$\begin{aligned} V_i &\leq V_{max}^F - r_i^F I_i + \alpha_i \\ V_i &\geq V_{min}^F \\ I_i, \alpha_i &\geq 0, I_i \alpha_i = 0. \end{aligned} \bigg\} \forall i \in N^F, \quad (2)$$

where a product of a current at a substation $I_i$ and an excessive voltage at the substation $\alpha_i$ is zero. This constraint is precisely a complementarily constraint, which requires that at any feasible solution either $I_i$ or $\alpha_i$ vanishes. The value $\alpha_i$ is a measure of a maximum voltage violation at a feeding substation.

Consequently, when $I_i > 0$, the scalar $\alpha_i = 0$ and the upper bound of $$V_{max}^R - r_i^F I_i$$

are imposed on the voltage. When $I_i$=0 the scalar $\alpha_i \geq 0$ can be positive to allow the voltage to exceed $V_{max}^F$. The above constraints are differentiable. Hence, the complementarity constraints enable us to model the otherwise unsmooth substation behavior using smooth constraints.

Power Consuming Trains

FIG. 413 shows the relationship 440 of voltage and current for power consuming trains (i∈$N^A$). The power $P_i^A$ consumed by each of these trains can be expressed as $$\begin{aligned} V_i I_i &= -P_i^A \\ I_i &\leq 0 \end{aligned} \bigg\} \forall i \in N^A. \quad (3)$$

A non-positivity bound on the current ensures that only these trains consume power.

Regenerative Trains

FIG. 4C shows the relationship 450 of voltage and current for the regenerative trains (R). The regenerative trains (i∈$N^R$) can supply power generated from braking to the DC network. The amount of generated power is $$\begin{aligned} P_i^R &\leq \begin{cases} P_{max}^R \text{ if } V_i \leq V_{min}^R \\ P_{max}^R \frac{V_{max}^R - V_i}{V_{max}^R - V_{min}^R} \text{ if } V_{min}^R \leq V_i \leq V_{max}^R \end{cases} \\ P_i^R &\geq 0 \\ P_i^R &= V_i I_i \\ I_i &\geq 0 \end{aligned} \bigg\} \forall i \in N^R, \quad (4)$$

where $P_{max}^R$ is the maximal power that is available from the regenerative train, and $V_{min}^R, V_{max}^R$ are bounds on the voltages. The amount of power that can be recovered is greatest when the voltage at the train is less than $V_{min}^R$. At higher voltages, the amount of power available for recovery decreases linearly with increasing voltage $V_i \geq V_{min}$. For voltages higher than $V_{max}^R$, power is not available from the regenerative trains.

FIG. 5 shows an example of the optimization 510 subject to complementarity constraints using the relationships 520 of various measurements of voltages, currents, resistances at nodes in the railway system 100. Notably, the optimization ensures that the voltages are within minimal and maximal limits.

Complementarity Constraints

Figure 6:
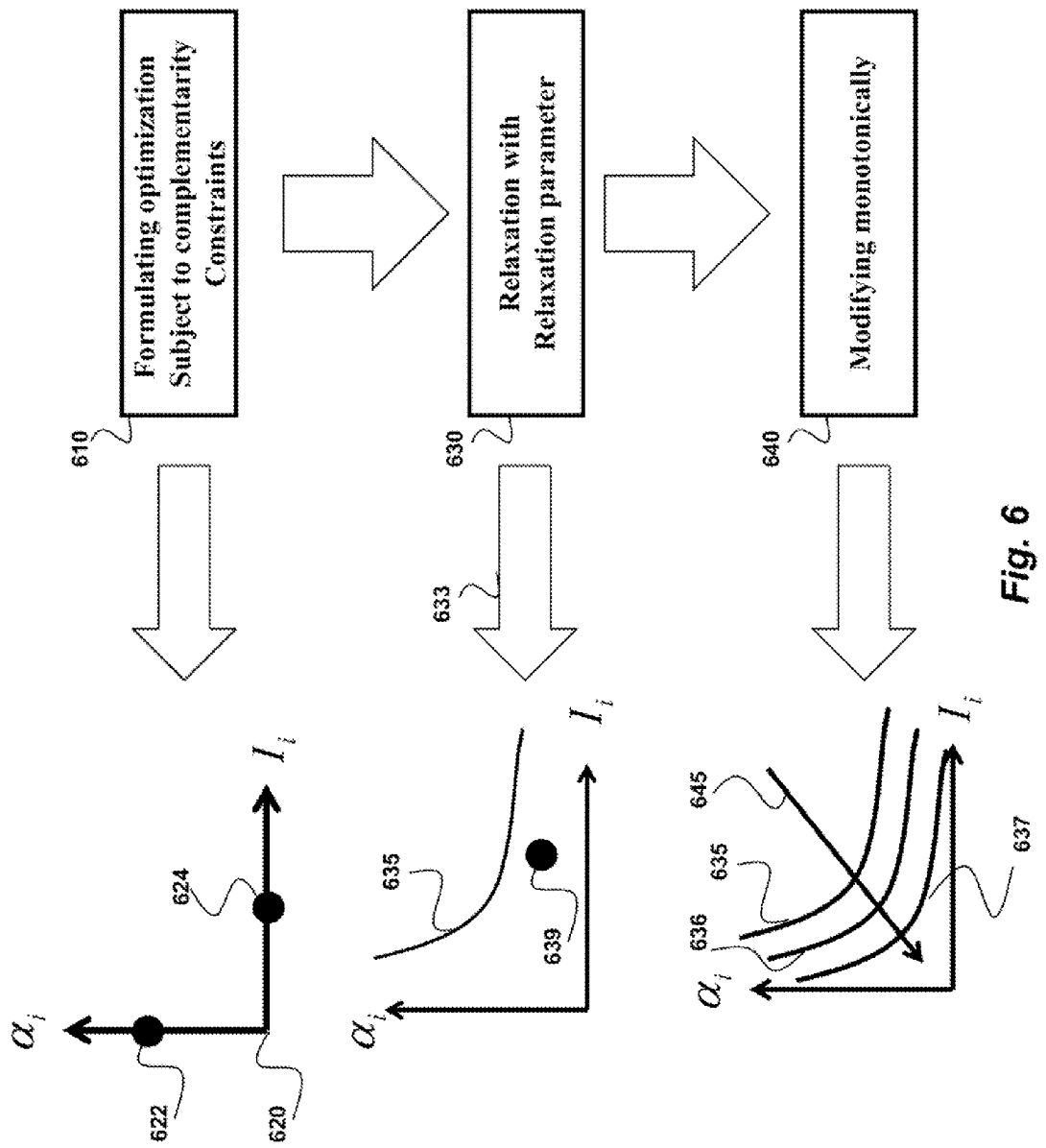
FIG. 6 is a schematic of a method for optimizing energy consumption of the railway system according to some embodiments of the invention.

FIG. 6 shows a schematic of a method for optimizing energy consumption of the railway system according to some embodiments of the invention. The optimization of the energy consumption is formulated 610 subject to complementarity constraints. The example of such formulation is optimization 510 of FIG. 5.

The plot 620 shows a feasible region of points representing the solution satisfying the complementarity constraints. In the plot 620, feasible points are on one of the axes. For example, the feasible points include a feasible point 622, i.e., $I_i$=0, or a feasible point 624, i.e., $\alpha_i$=0.

Some embodiments use non-linear optimization methods to determine the control parameters. However, due to the limitation on the feasibility region defined by the complementarity constraints, some non-linear optimization methods solve complementarity constraint problem with unacceptably high error rate. For example, interior point methods, which are routinely used for solving nonlinear programs, require (i) strictly feasible interior, and (ii) gradients of active constraints that are linearly independent. However, the complementarity constraint problem is degenerated and not well suited for solving by interior point algorithms.

Based on this realization, some embodiments of the invention optimize the control parameters based on iterative relaxation of the complementarity constraint. The iterative relaxation of the complementarity constraint can approximate ill-posed problem as a set of well-posed problems, which increase accuracy of the solution and reduce computational time.

Accordingly, some embodiments relax 630 the feasibility region with relaxation parameter, e.g., μ>0 635. The relaxation parameter 633 defines the curve 635 such that feasible points of the solution lay between the axis 620 and the curve 635. There exists a strictly feasible interior point 639, and the problem is well-posed.

The optimization using relaxation of the complementarity constraint is solved iteratively. In one embodiment, the relaxation parameter is modified monotonically 640 forming, e.g., the curves 635-637. For example, the interior point method iteratively reduces 645 value of μ to zero. As μ approaches zero, the method recovers the complementarity constraints. This yields strictly a feasible interior for some complementarity constraints even as µ approaches zero, with a better performance. Specifically, approximating ill-posed problem as a set of well-posed problems increases accuracy of the solution and reduces computational time. Below are the various method used by some embodiments of the invention for solving a program with complementarity constraint.

Mathematical Program with Complementarity Constraints (MPCC)

In one embodiment, the optimization problem is formulated as $$\min \sum_{i \in N^F} V_i I_i \quad \text{Total feeding power} \quad (5)$$

$$\text{s.t.} \quad V_i - V_{i+1} = r_i^L I_i^L \forall\, i = 1, \ldots N-1 \quad \text{Voltage drop}$$

$$\left.\begin{array}{l} I_1 = I_1^L \\ I_i^L + I_{i+1} = I_{i+1}^L \forall\, i = 1, \ldots N-2 \\ I_{N-1}^L + I_N = 0 \end{array}\right\} \quad \text{Current balance}$$

Constraints in (2)      Feeding station

Constraints in (3)      Power drawing trains

Constraints in (4)      Decelerating train.

in the above formulation (5), the optimization is formulated as a minimization of the sum of the power ($\Sigma V_i I_i$) supplied by the electric grid. The constraints include the voltage drop due to the resistance in the lines connecting the nodes, the need to balance current flowing on these lines, and the constraints as in. Eqns. (2-4). The formulation above assumes the DC network is represented by a line graph for ease of illustration. This is not a restriction of the approach and it can accommodate more general graph representations.

Because the embodiment uses the complementarity formulation of Eqn. (2) for the substations, the above problem is an instance of MPCC. The MPCC is a class of nonlinear programs (NLPs) that includes complementarity constraints.

For any MPCC, a Linear Independence Constraint Qualification (LICQ) fails to hold at any feasible point. LICQ is typically assumed at a solution point of a NLP, and this ensures uniqueness of multipliers. The lack of this property implies that the multiplier set is not unique at a minimizer of the MPCC. Furthermore, the failure of LICQ at any feasible point implies difficulty in step calculation as the Newton system is singular. Furthermore, there is no strict interior for the feasible region. This implies the failure of a weaker Mangasarian Fromovitz Constraint Qualification (MFCQ). The failure of MFCQ renders the multiplier set unbounded at the solution.

Interior point methods 360 can solve large-scale inequality constrained NLPs. Interior methods require a strictly feasible interior for the constraint set of the NLP. The lack of strict interior also makes it difficult to apply interior point methods to MPCC. However, the complementarity constraints can be reformulated to allow a strictly feasible interior to which interior point methods can be applied.

Interior Point Method

Some embodiments of the invention are based on a realization that approximation reformulates complementarity constraints as inequality constraints. Optimization under inequality constraints is a difficult optimization problem. However, the interior point method was designed for inequality constraints, and thus, advantageously used in the iterative relaxation method.

For example, some embodiments use at least two reformulations of the MPCC, which enable interior point methods to be applied. For the purposes of brevity, we express the MPCC in Eqn. (5) as, $$\min \quad f(V, I) \quad (6)$$

$$\text{s.t.} \quad h(V, I, I^L, \alpha) = 0$$

$$g(V, I) \le 0$$

$$I_i, \alpha_i \ge 0,\, I_i \alpha_i = 0 \,\forall\, i \in N^F,$$

Where $V=(V_1, \ldots, V_{|N|})$ and $I=(I_1, \ldots, I_{|N|})$ are sets of voltages and currents supplied to the DC network by the electric grid and the generating trains and drawn by the consuming trains at the N nodes, $$I^L = (I_1^L, \ldots, I_{|N|-1}^L)$$

is the set of en between the nodes, and $\alpha=(\alpha_i)_{i \in N^A}$ is the set of variables denoting an amount by which the substation voltages exceed an operational maximal at the substations. In (6), the reformulation $f(\Sigma V_i I_i)$ includes the equality and inequality constraints.

The function $h: R^{3|N|-1+|N^A|} \to R^{m_e}$ denotes the set of real equality constraints in Eqn. (5), with the exception of the complementarity constraints, the function $g: R^{2|N|} \to R^{m_i}$ represents the inequality constraints in Eqn. (5) with the exception of bounds on $I_i, \alpha_i$ for $i \in N^F$, and f represents the objective function in Eqn. (5).

The interior point method applied according to Eqn. (6) solves the following equality constrained problem. The problem is obtained by posing the inequality constraints in the objective function with a barrier term $$\min \quad f(V, I) - \mu \sum_{i=1}^{m_i} \ln(s_i) - \mu \sum_{i \in N^A} (\ln(I_i) + \ln(\alpha_i)) \quad (7)$$

$$\text{s.t.} \quad h(V, I, I^L, \alpha) = 0$$

$$g(V, I) + s = 0$$

$$I_i \alpha_i = 0 \,\forall\, i \in N^F,$$

where $\mu>0$ is the barrier parameter, and $S_i: i \in \{1, \ldots, m_i\}$ are slack variables for the inequality constraints g. In an optimization problem, a slack variable is a variable that is added to an inequality constraint to transform it to an equality. Barrier methods are an alternative for constrained optimization. Barrier methods use the barrier parameter to force the iterates to remain interior to the feasible domain, and biases the iterates to remain away from the boundary of the feasible region.

Conceptually, the interior point method starts from a high barrier value of $\mu>0$, and solves a sequence of problems of Eqn. (7) for decreasing values of µ. An initial iterate, such that s>0, is $I_i \alpha_i > 0 \forall i \in N^A$. The barrier parameter iterates in interior of the nonnegative orthant (hyperoctant) as th objective approaches infinity on the boundary. However, as µ decreases, the iterates are allowed to approach the boundary of the orthant, thus recovering a solution that lies at the bounds. In the limit, under certain assumptions, the sequence of solutions for different µ approaches the solution of Equ. (6). However, in the case of MPCCs, there are no $\alpha_i, I_i > 0$ that are feasible in Eqn. (7).

Penalty Reformulation

In this embodiment, the complementarity constraints in Eqn. (6) are penalized in the objective function as $$f_\pi(V, I) := f(V, I) + \pi \sum_{i \in N^A} I_i \alpha_i, \quad (10)$$

where $\pi$ is a penalty parameter.

With the above formulation, the optimization problem always possesses a strict interior. This is in contrast with a prior art approach where the problem loses the strict interior in the limit. Thus, the penalty formulation removes some of the deficiencies of the inequality formulation. However, it is possible that at a solution of the penalized formulation some of $I_i$, $\alpha_i$ can violate the complementarity constraint 335. The barrier problem for this relaxation is $$\min \quad f_\pi(V, I) - \mu \sum_{i=1}^{m_i} \ln(s_i) - \mu \sum_{i \in N^A} (\ln(I_i) + \ln(\alpha_i)) \quad (11)$$

$$s.t. \quad h(V, I, I^L, \alpha) = 0$$

$$g(V, I) + s = 0.$$

Inequality Reformulation

To implement complementarity relaxation, some embodiments formulate the complementarity constraint as inequalities. Some variations of those embodiments use the barrier parameter to modify the constraint evaluation for the complementarity constraints.

Figure 7:
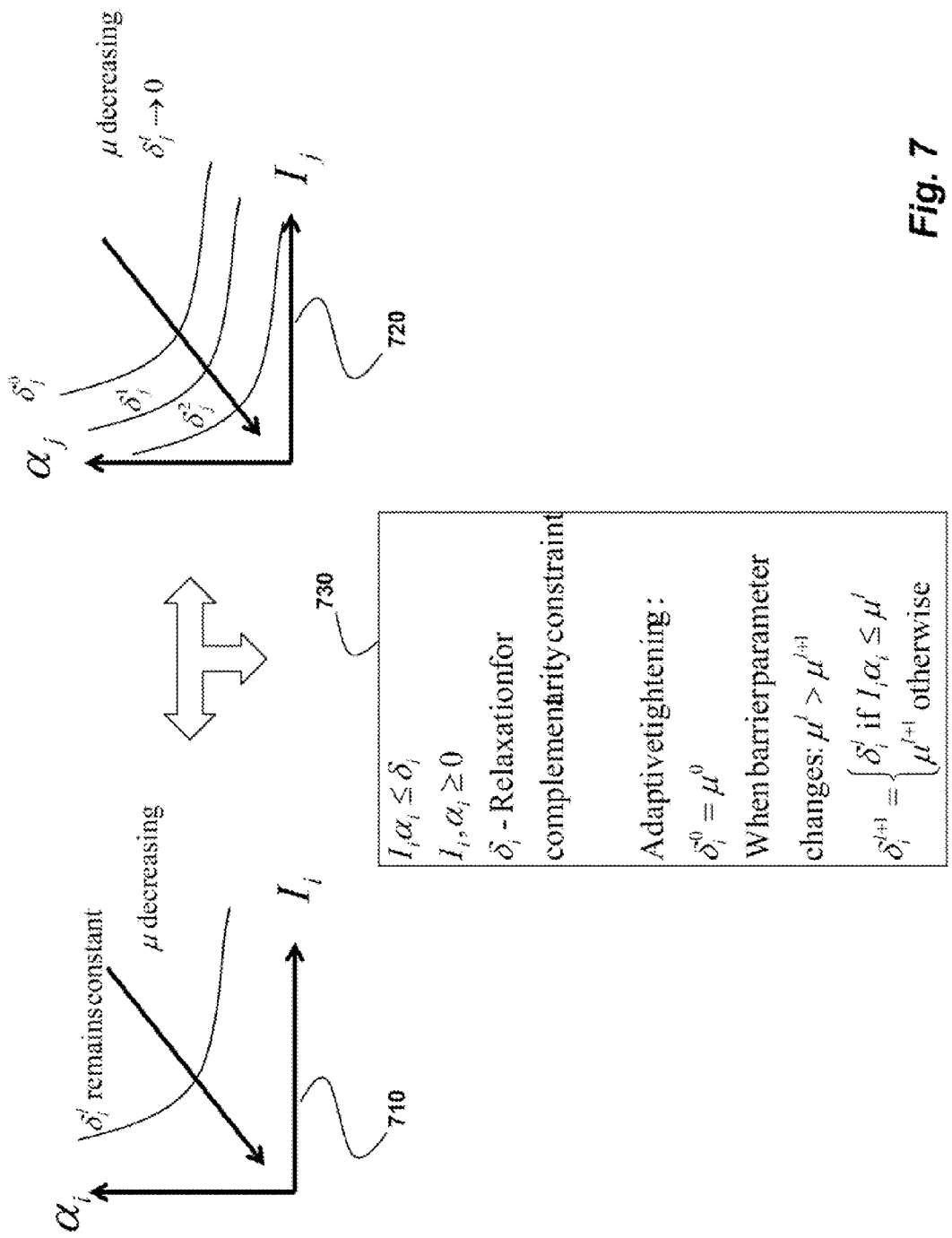
FIG. 7 is an illustration of relaxation of the complementarity constraints by multiple parameters according to one embodiment of the invention.

FIG. 7 shows plots 710 and 720 illustrating relaxation 730 of the complementarily constraints by multiple parameters, e.g., the barrier parameter $\mu$, and the relaxation parameter $\delta$. Both parameters can be tightened dependently. In this embodiment, the constraints are strictly feasible interior for some complementarity constraints even as $\mu$ approaches zero, which can increase a performance of the optimization method.

For example, in one embodiment, the complementarity constraint is reformulated as $$I_i \alpha_i \leq \delta \mu, \quad (8)$$

where $\delta > 0$. The complementarity constraint is increased by an amount proportional to the barrier parameter. Hence, for all $\mu > 0$, there exists a strict interior for the barrier problem. As the barrier parameter $\mu$ approaches zero, we converge to a solution of the MPCC in Eqn. (6). The barrier problem for this relaxation is $$\min \quad f(V, I) - \mu \sum_{i=1}^{m_i} \ln(s_i) - \mu \sum_{i \in N^A} (\ln(I_i) + \ln(\alpha_i) + \ln(s_i^c)) \quad (9)$$

$$s.t. \quad h(V, I, I^L, \alpha) = 0$$

$$g(V, I) + s = 0$$

$$I_i \alpha_i + s_i^c = \delta \mu \, \forall \, i \in N^F.$$

FIG. 8 shows the pseudocode of the method for the above complementarity inequality reformulation. Steps 1-3 of the method initialize the variables, set the iteration parameters, and select constraints. Steps 5-7 solves iteratively the above barrier problem (9).

Adaptive Relaxation

Figure 9:
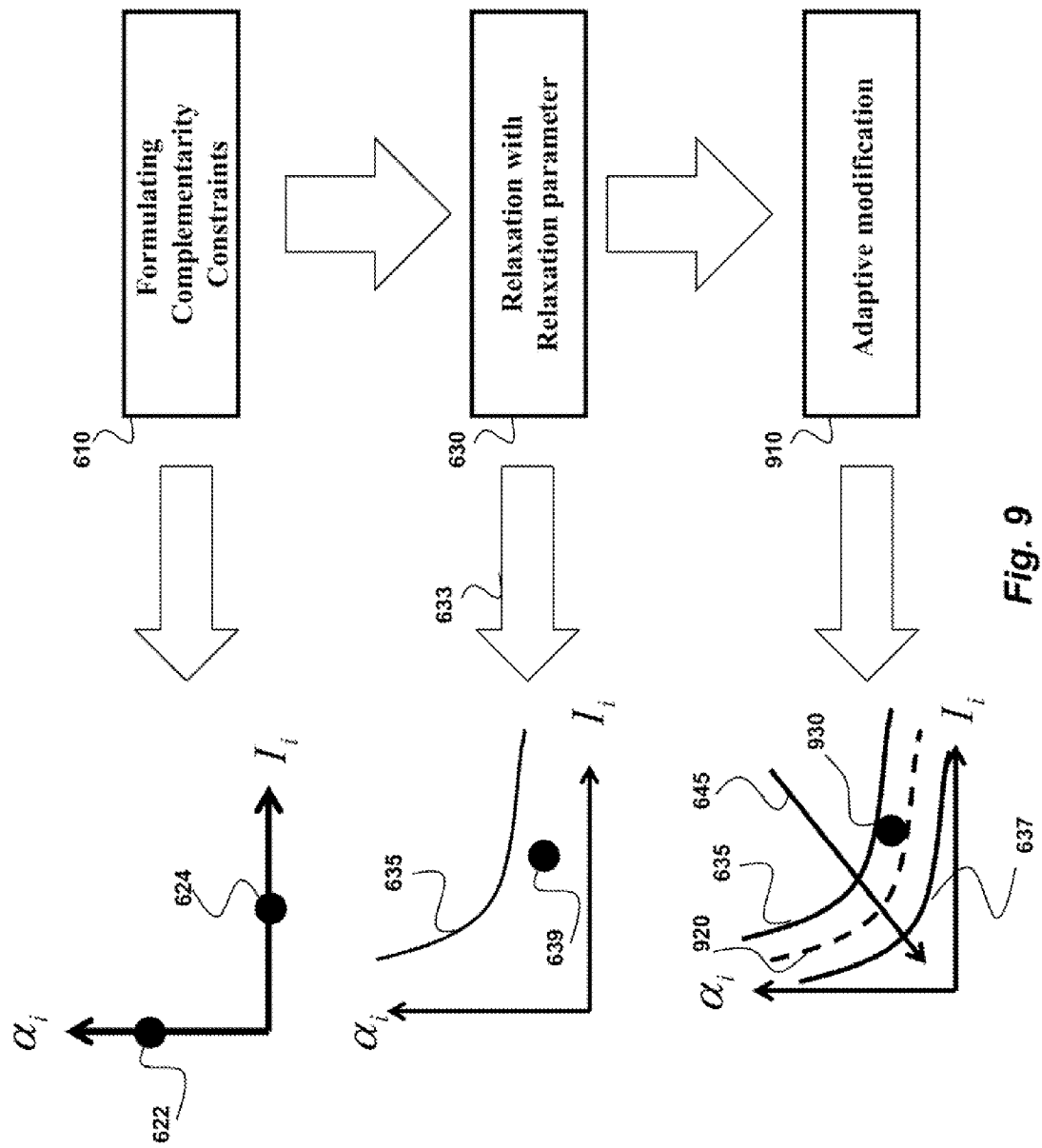
FIG. 9 is a schematic of another method according another embodiment of the invention.

FIG. 9 shows a schematic of another method according to another embodiment of the invention. This embodiment is based on a realization that with reduction of the relaxation parameter, the well-posed problems are progressively transformed into ill-posed problems. Therefore, it is advantageous to reduce the relaxation parameter only when necessary. Thus, one embodiment of the invention optimizes the control parameters iteratively using adaptive modification 910 of a relaxation parameter. In this embodiment, for each iteration, the relaxation parameter is modified 720 only if the complementarity constraint of the solution for a current value of the relaxation parameter is violated.

For example, in one iteration of the method for optimizing the control parameters iteratively using adaptive modification of a relaxation parameter, a current value of the relaxation parameter define the feasible region under the curve 635. If the solution 930 of the method for this iteration is feasible, i.e., under the curve 635, the next iteration does not update the relaxation parameter, skip the relaxation parameter that defines the curve 920, and uses the relaxation parameter of the curve 635 instead. Thus the next iteration optimizes the solution 930 using the relaxation parameter of the curve 635, which is more well-posed problem than problem for relaxation parameter of the curve 920. If the solution of the next iteration violates the relaxed complementarity constraints, the relaxation parameter is modified, e.g., to correspond to the curve 637.

Inequality Reformulation with Adaptive Relaxation

Figure 10:
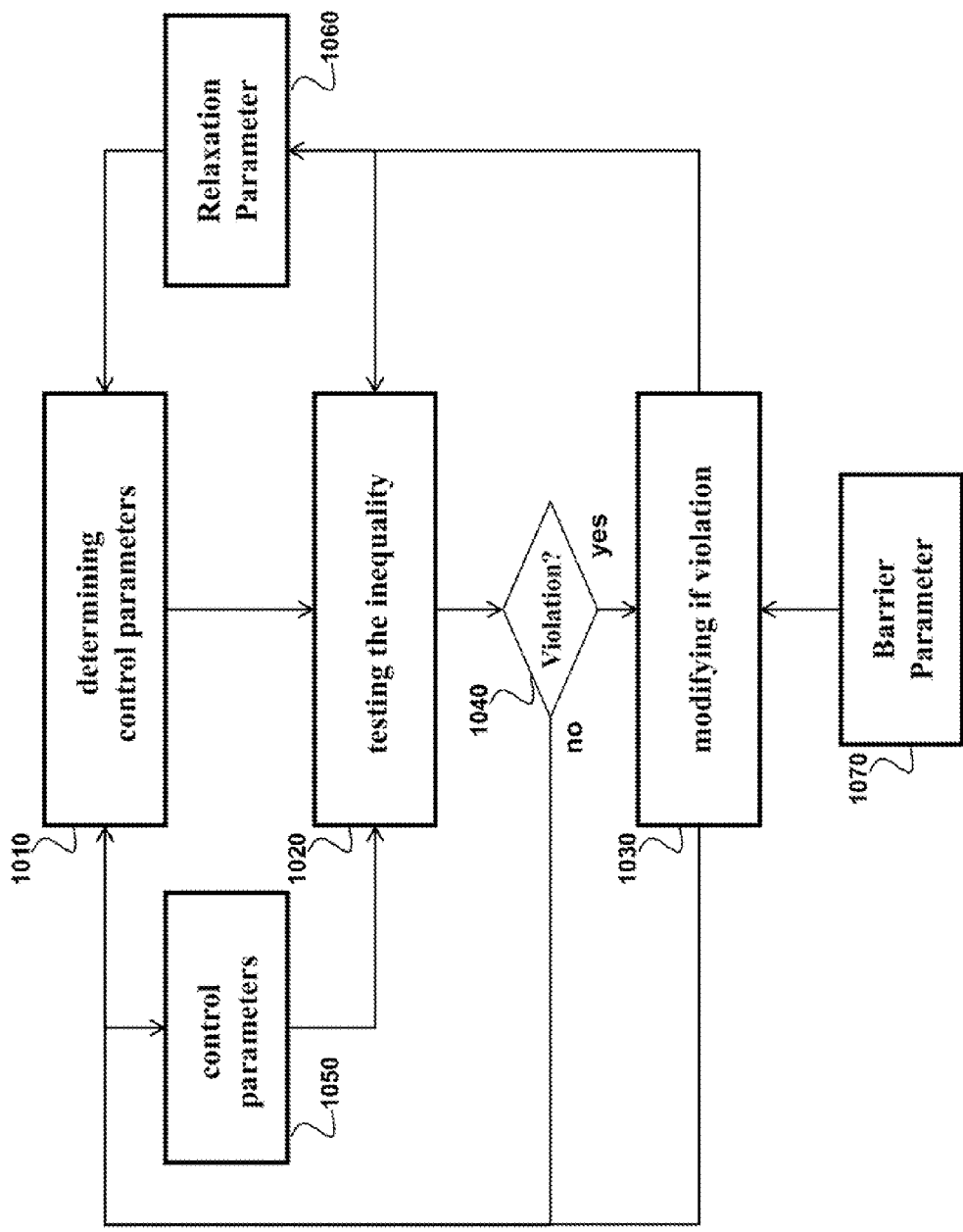
FIG. 10 is a block diagram of an optimization method according to one embodiment of the invention.

FIG. 10 shows a block diagram of a method according to one embodiment of the invention. In one variation of this embodiment, the complementarity constraint for a substation of the railway system includes a product of a current at the substation and an excessive voltage at the substation. The optimization according to this embodiment reformulates the complementarity constraint as an inequality, such that the product of the current and the excessive voltage is less than a relaxation parameter 1060. Next, this embodiment determines 1010 the control parameters 1050 iteratively based on testing 1020 the inequality, wherein a value of the relaxation parameter is adaptively reduced for subsequent iterations. In one variation of this embodiment, the current iteration includes determining the control parameters based on values of the control parameters determined during a previous iteration. The inequality is tested 1020 using values of the control parameters corresponding to that of the current and the excessive voltage of the substation, and the value of the relaxation parameter is modified 1030 if the inequality is violated 1040.

Some embodiments combine adaptive relaxation with an interior point method to further optimize the solution. For example, one embodiment determines the relaxation parameter to be proportional to the barrier parameter 1070. This proportionality simplifies determining of the modified value of relaxation parameter in subsequent iterations. This is because the barrier parameters are monotonically decreasing, and when the relaxed complementarity constraint is violated, the relaxation parameter is modified to match appropriately the reduction in barrier parameter.

For example, the embodiment relaxes each complementarity constraint as $$I_i \alpha_i \leq \eta_i, \quad (12)$$

where $\eta_i > 0$. The relaxation is adaptively tightened. The barrier problem for this relaxation is $$\min \quad f(V, I) - \mu \sum_{i=1}^{m_i} \ln(s_i) - \mu \sum_{i \in N^A} (\ln(I_i) + \ln(\alpha_i) + \ln(s_i^c)) \quad (13)$$

$$\text{s.t.} \quad h(V, I, I^L, \alpha) = 0$$

$$g(V, I) + s = 0$$

$$I_i \alpha_i + s_i^c = \eta_i \forall\, i \in N^F,$$

FIG. 11 shows the pseudocode for solving the barrier problem with adaptive relaxation 1100.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output devices. These devices can be used, among other things, to present a user interface. Examples of Output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. In this respect, the invention may be embodied as a computer readable storage medium or multiple computer readable media, e.g., a computer memory, compact discs (CD), optical discs, digital video disks (DVD), magnetic tapes, and flash memories. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order alone claim element over another or the temporal order in which acts of a method are performed, but are used merely as labels to distinguish one claim element having a certain name from another element having a same name (but for use of the ordinal term) to distinguish the claim elements.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for optimizing energy consumption in a railway system including a set of trains and a set of substations connected to a grid for providing power to the set of trains, comprising:
    optimizing control parameters controlling at least part of the energy consumption of the railway system to produce optimized control parameters, wherein the optimized control parameters minimize a total power provided by the grid to satisfy a power demand of the railway system, wherein the optimizing is subject to constraints on operations of the railway system, the constraints include a complementarity constraint; and
    generating a command to control the energy consumption of the railway system based on the optimized control parameters, wherein steps of the method are performed by a processor.

2. The method of claim 1, wherein the set of trains includes a set of power consuming trains and a set of power regenerating trains, and wherein the control parameters include values of voltages and currents for each substation and for each train.

3. The method of claim 2, further comprising:
    determining a state of the railway system at a point of time, wherein the state includes locations of the trains, and the power demand of the power consuming trains; and
    optimizing the control parameters according to the state.

4. The method of claim 3, further comprising:
    determining the state based on run curves of the trains.

5. The method of claim 4, further comprising:
    modifying the state based on measurements of the state at the point of time.

6. The method of claim 1, wherein the complementarity constraint includes a product of a current at a substation and an excessive voltage at the substation.

7. The method of claim 1, wherein the optimizing comprises:
optimizing the control parameters using iterative relaxation of the complementarity constraint.

8. The method of claim 7, wherein the complementarity constraint is relaxed according to a relaxation parameter, and wherein, for each iteration, the relaxation parameter is reduced monotonically.

9. The method of claim 7, wherein the optimizing further comprises:
optimizing the control parameters using an interior point method.

10. The method of claim 7, wherein the optimizing further comprises:
optimizing the control parameters iteratively using adaptive modification of a relaxation parameter, wherein, for each iteration, the relaxation parameter is modified only if the complementarity constraint for a current value of the relaxation parameter is violated.

11. The method of claim 7, wherein the complementarily constraint for a substation includes a product of a current at a substation and an excessive voltage at the substation, and wherein the optimizing further comprises:
reformulating the complementarity constraint as an inequality, such that the product of the current and the excessive voltage is less than a relaxation parameter; and
determining the control parameters iteratively based on the inequality, wherein a value of the relaxation parameter is adaptively reduced for subsequent iterations.

12. The method of claim 11, wherein the determining for a current iteration comprises:
determining the control parameters based on values of the control parameters determined during a previous iteration;
testing the inequality using values of the control parameters corresponding to that of the current and the excessive voltage of the substation; and
modifying the value of the relaxation parameter, if the inequality is violated.

13. The method of claim 12, wherein the optimizing uses an interior point method, wherein the relaxation parameter is proportional to a barrier parameter of the interior point method, and wherein the barrier parameter is monotonically reduced for each iteration.

14. The method of claim 7, wherein the complementarity constraint for a substation includes a product of a current at the substation and an excessive voltage at the substation, and wherein the optimizing further comprises:
reformulating the complementarity constraint as an inequality, such that the product of the current and the excessive voltage is less than a relaxation parameter; and
determining the control parameters iteratively using an interior point method based on a barrier problem.

15. A system for optimizing energy consumption of a railway system including a set of trains and a set of substations connected to a grid for providing power to the railway system, comprising:
a processor for optimizing control parameters controlling at least part of the energy consumption of the railway system, such that a power demand of the railway system is satisfied and a total power provided by the grid is minimized, wherein the optimizing is subject to constraints on operations of the trains and constraints on operations of the substations, wherein the constraints on the operations of the substations include a complementarity constraint, wherein the processor optimizes the control parameters based on a relaxation of the complementarity constraint.

16. The system of claim 15, wherein the complementarity constraint includes a product of a current at a substation and an excessive voltage at the substation.

17. The system of claim 15, wherein the constraint includes $$\left. \begin{array}{r} V_i \leq V_{max}^F - r_i^F I_i + \alpha_i \\ V_i \geq V_{min}^F \\ I_i, \alpha_i \geq 0, I_i \alpha_i = 0. \end{array} \right\} \forall\, i \in N^F,$$

wherein $V_i$ is a voltage and $I_i$ is a current at a substation from the set of substation $N^F$, $V_{min}^F$, $V_{max}^F$ are minimal, maximal operational voltages, and $r_i^F$ is an internal resistance at the substation, wherein a product of the current $I_i$ and an excessive voltage at the substation $\alpha_i$ is zero.

* * * * *